United States Patent
Gu et al.

(10) Patent No.: US 9,663,899 B2
(45) Date of Patent: May 30, 2017

(54) METHOD FOR MAKING LIGNOCELLULOSIC PAPER AND PAPER PRODUCT

(71) Applicant: Solenis Technologies, L.P., Schaffhausen (CH)

(72) Inventors: Qu-Ming Gu, Bear (DE); Josette Huynh-Ba, Hockessin (DE)

(73) Assignee: Solenis Technologies, L.P. (CH)

( * ) Notice: Subject to any disclaimer, the term of this patent is extended or adjusted under 35 U.S.C. 154(b) by 0 days.

(21) Appl. No.: 14/835,931

(22) Filed: Aug. 26, 2015

(65) Prior Publication Data

US 2017/0058459 A1    Mar. 2, 2017

(51) Int. Cl.
| | |
|---|---|
| *D21H 17/22* | (2006.01) |
| *D21H 21/18* | (2006.01) |
| *D21H 17/00* | (2006.01) |
| *D21H 11/14* | (2006.01) |
| *D21H 17/45* | (2006.01) |

(52) U.S. Cl.
CPC ............ *D21H 21/18* (2013.01); *D21H 11/14* (2013.01); *D21H 17/005* (2013.01); *D21H 17/455* (2013.01)

(58) Field of Classification Search
CPC ........ D21H 17/22; D21H 17/62; D21H 11/00; D21H 17/66; D21H 21/02
USPC ........................................................ 162/174
See application file for complete search history.

(56) References Cited

U.S. PATENT DOCUMENTS

| | | | |
|---|---|---|---|
| 5,338,403 A | 8/1994 | Pedersen | |
| 5,603,804 A | 2/1997 | Hansen et al. | |
| 6,207,009 B1 | 3/2001 | Hansen et al. | |
| 6,610,172 B1 | 8/2003 | Lund et al. | |
| 8,388,806 B2 * | 3/2013 | Gu | C08G 65/22 |
| | | | 162/158 |
| 8,454,798 B2 | 6/2013 | Ban et al. | |
| 8,604,134 B2 * | 12/2013 | Gu | D21H 17/36 |
| | | | 162/164.6 |
| 2003/0089472 A1 * | 5/2003 | Cheng | C12N 9/96 |
| | | | 162/65 |
| 2003/0094251 A1 * | 5/2003 | Cheng | C12N 9/0061 |
| | | | 162/72 |
| 2003/0096394 A1 * | 5/2003 | Cheng | C12P 1/00 |
| | | | 435/277 |
| 2007/0261806 A1 | 11/2007 | Wang et al. | |
| 2010/0269989 A1 | 10/2010 | Wang et al. | |
| 2011/0016545 A1 * | 1/2011 | Gray | C12N 9/248 |
| | | | 800/15 |
| 2011/0253333 A1 | 10/2011 | Ban et al. | |
| 2013/0146239 A1 | 6/2013 | Tausche et al. | |
| 2014/0116635 A1 | 5/2014 | Porto et al. | |
| 2014/0116653 A1 | 5/2014 | Lange et al. | |
| 2014/0174685 A1 * | 6/2014 | Gu | C12N 9/2437 |
| | | | 162/168.7 |

FOREIGN PATENT DOCUMENTS

| | | |
|---|---|---|
| WO | 8904361 | 5/1989 |
| WO | 03023142 | 3/2003 |

OTHER PUBLICATIONS

ISR, PCT/US2016/045510, Oct. 18, 2016, pp. 2.

* cited by examiner

*Primary Examiner* — Mark Halpern
(74) *Attorney, Agent, or Firm* — Michael J Herman; Joanne Rossi

(57) ABSTRACT

Enzyme compositions comprising laccase, lipase, cationic polymer, and optionally laccase activator, for papermaking application are disclosed. It also relates to the use of the enzyme composition to improve dry strength property of a paper product made from lignocellulosic-containing materials before or after mechanical refining in a papermaking process.

13 Claims, No Drawings

METHOD FOR MAKING LIGNOCELLULOSIC PAPER AND PAPER PRODUCT

BACKGROUND OF THE INVENTION

The present invention relates to a method of making paper and paper products. More specifically, a laccase, lipase and cationic fixative polymer composition is added to a lignocellulosic suspension to help improve dry strength of the paper and paper products.

Paper pulp is typically processed from wood through the Kraft processes. This process produces a cellulosic fiber with a dark brown color, mostly due to the presence of lignin. For some applications, lignin molecules are further removed by a process known as bleaching to produce bleached fiber suitable for making paper products such as tissue, towel, and printing and writing paper. For other uses such as linerboard, unbleached fiber is preferred because it is economical and also environmental friendly for not going through bleaching process using toxic bleaching chemicals. Unbleached Kraft fiber usually contains 1% to 2% lignin. Although lignin is significantly reduced via the Kraft process, the remaining lignin is embedded in cellulose, resulting in a lignocellulosic material that requires more than 50% of the energy that is needed to refine a bleached fiber mechanically in papermaking processes. Other mechanical pulps such as thermal mechanical pulp (TMP) is another type of unbleached fiber that is widely used for papermaking. Lignocellulosic material is a term used to describe the wood fiber that contains lignin molecules. Many recycled brown furnishes are derived from a mixture of different types of fibers with inferior quality than virgin fibers. Recycled fibers, e.g., old corrugated container (OCC) and waste newspaper, not only contain lignin, hemicellulose and other biomass, but also contain a significant amount of contaminants known as stickies and pitches such as polyvinyl acetate and ester organic contaminants. These types of contaminants can interfere with fiber to fiber bonding resulting in decreased dry strength of the final product.

To restore dry strength properties of the paper product made from recycled lignocellulosic material such as poor quality OCC fiber, papermakers traditionally use synthetic polymeric dry strength additives. The use of enzymes for papermaking has gained popularity steadily due to the rapid developments of robust and inexpensive enzyme products and its environmentally friendly approach. Although cellulases are being used recently for paper dry strength, the commercial success is limited to bleached virgin fiber or deinking pulp (DIP). It is evident that accessibility of cellulase to lignocellulosic fiber is hindered by lignin molecule and other non-cellulosic biomasses bound with the cellulose. Although many commercial trials have been attempted, cellulase is generally not suitable for poor quality recycled lignocellulosic fiber, or short fiber TMP, etc., for dry strength application. Until now, no enzyme technology has achieved significant commercial success in papermaking with recycled OCC fiber, particularly poor quality OCC. Thus, there is a need of an environmentally friendly and sustainable enzyme approach for recycled OCC or unbleached virgin fiber as an alternative technology or a replacement of the synthetic polymeric additives.

Laccases are copper-containing enzymes that are known to be good oxidizing agents in the presence of oxygen and are used for many other applications, including treatment of pulp waste water, pulp de-inking, industrial color removal, bleach for laundry detergents, oral care teeth whiteners. Laccases are being widely investigated for bio-bleaching wood fiber in pulping process as a replacement for toxic chemical bleaching reagents. Laccase is also capable of polymerizing lignin or polyphenols in the wood fiber and thereby widely investigated as a catalyst or a facilitator to improve paper dry strength, either with or without mediators or radical generating chemicals. The likely mechanism for the improved strength was the crosslinking of lignocellulosic fiber through lignin oxidation and polymerization. In addition, laccase may also oxidize other phenolic-containing components such as aromatic side chains in protein, hemicellulose, cellulosic fiber, etc. under specific radical-assisted conditions, to provide functional groups that interact with each other to give paper strength properties. Advantageously, the actions of laccase on lignin and other functional groups generally have no adverse effect on fiber quality such as fiber length under conventional papermaking conditions.

U.S. Pat. No. 6,207,009 disclosed a process for producing paper or paperboard from mechanical pulp in which the pulp is treated with a phenol-oxidizing enzyme, particularly laccase and peroxidase, after mechanical refining of the pulp has been completed. The resulting paper exhibits an increased strength relative to paper produced from untreated pulp. The prior art did not mention any synergistic effect of laccase with lipase and cationic polymers for recycled lignocellulosic fiber. Similarly, U.S. Pat. No. 6,610,172 claimed a process for producing paper materials having improved wet strength. This process involves (a) preparing a suspension of unbleached or semi-bleached chemical or semichemical pulp or pulp from recycled fibers; (b) treating the pulp with a phenol-oxidizing enzyme, e.g., laccase, and a mediator; and (c) de-watering the treated pulp in a papermaking machine to make paper. U.S. Pat. No. 5,603,804 described a process for producing linerboard or corrugated medium using the oxidase-treated pulp. The pulp is unbleached Kraft pulp, neutral sulfite semichemical pulp, or recycled pulp from old corrugated containers or old news print. The oxidases include laccase, or catechol oxidase, or bilirubin oxidase.

US Patent Application No. 2014116635 described a method of making paper or paperboard having enhanced dry strength using a laccase or a cellulase enzyme and a cationic water-soluble polymer. The prior art did not disclose any synergistic effect of laccase with lipase and cationic polymers on OCC recycled fiber.

Lipase or esterase has been commercially used for removing stickies or pitches adhered on the fiber surface in papermaking. Stickies content varies with fiber type and paper mill systems, and it poses a major problem to recycled paper mills, particularly to the Asian or European linerboard mills that routinely use poor quality recycled OCC. Not only do hydrophobic stickies or pitches accumulated on the process machinery to reduce productivity and/or deposit on paper products to lower paper product quality, but also do those hydrophobic organic contaminants interfere with cellulosic fiber-fiber interaction and thereby reducing paper strength. In addition, those hydrophobic contaminants on fiber surface could prevent enzymes and chemical additives from accessing to fiber surface for reaction or interactions, and reduce the efficiency of these reagents.

US Patent Application No. 20070261806 disclosed methods of treating pulp stocks with an enzyme formulation containing one or more oxidative enzymes, to reduce pitch deposition. It described that the pulp stock is treated with an enzyme formulation containing laccases, peroxidases, esterases, and/or combinations thereof. The enzyme formulations may also contain a laccase mediator and/or a dispersant. The enzyme formulation can be applied at any of several locations during the pulping and/or papermaking process, but typically applied as a solution to the pulp stock. The prior art did not discuss the effect of a cationic polymer on laccase and esterase performances, and did not disclose any effect of the formations on paper dry strength property.

Cationic polymers could be used to blend with enzyme to improve enzyme stability and accessibility of the enzyme to cellulosic fiber surface via their fixative property. It could also benefit in fiber retention and COD reduction in recycled paper mills. Those benefits have been proved in the lab and also in many commercial practices.

U.S. Pat. No. 8,454,798 disclosed a method for making paper or paper board by applying a composition containing enzyme and cationic coagulant to papermaking pulp prior to paper forming. However, this prior art did not disclose any synergistic effect of laccase, esterase and cationic polymers on paper dry strength property.

US Patent Application 20140116653 disclosed a method of making paper or paperboard having enhanced dry strength using an enzyme and a polymer including at least one of a cationic water-soluble polymer and an amphoteric water-soluble polymer. The prior did not disclose any information on effect of esterase or lipase on paper strength.

It is known in the art that cationic polymer can be used in combination with enzyme for papermaking uses. Cationic polymers are used together with enzymes for stickies control and strength applications. Those cationic polymers includes poly(diallyldimethylammonium chloride), poly(DMA-Epi) polyamine, polyaminoamide derivatives and polyvinylamine derivatives etc. However, not all the cationic polymers would benefit enzymes performance or stability. As matter of a fact, many cationic polymers reduce or deactivate activity of the enzymes such as laccase and lipase. Polyvinylamine and glycoxylated PAM may covalently react and crosslink enzyme to deactivate the enzyme activity completely. Simply combining an enzyme with a cationic polymer is not a solution to all.

The current method provides a dry strength composition for papermaking to improve dry strength properties of a paper product and also improve the efficiency of the papermaking process. It has been discovered that a combination of laccase and lipase together with cationic polymer with or without a laccase activator provides for synergistic effects in papermaking and produces a paper product with improved dry strength properties. More specifically, the current method relates to the use of a composition to improve dry strength properties of a paper product by treating a pulp furnish containing lignocellulosic unbleached fiber and/or recycled brown stock.

In the current composition, laccase serves as an enzyme to polymerize lignin via oxidization, lipase catalyzes breakdown of organic stickies and pitches on fiber surfaces and improves accessibility of laccase and the fiber to fiber binding interaction. The cationic polymers help in dispersing stickies, stabilizing the laccase and lipase and improves fiber retention. When laccase and lipase were used in combination with a cationic polymer, a synergetic effect was observed. Thus, the invention provides a three-component dry strength composition for use in papermaking application.

BRIEF SUMMARY OF THE INVENTION

Provided is method of making a paper and paper products using a laccase, lipase, cationic fixative polymer composition as an additive to a lignocellulosic suspension. More particularly, the current method relates to the use of a laccase, lipase and cationic fixative polymer formulation or composition to improve dry strength properties of a paper product made primarily of unbleached lignocellulosic fibers and/or recycled brown stock. The dry strength composition includes, in addition to at least one cationic fixative polymer, at least one laccase having a laccase activity of at least 12 LAMU and at least one lipase having a lipase activity of 0.1 to 10 KLU per kilogram (kg) of dry fiber. The addition of the dry strength composition to the lignocellulosic suspension can be performed prior to, during, or after mechanical refining.

In the present application, it is believed laccase is an active ingredient that specifically catalyzes the oxidation of lignin, resulting in polymerization of lignin molecule. The laccase may also catalyze the oxidation of other phenolic components or carbohydrates under specific conditions. The lipase of the composition can catalyze the hydrolysis of the wood pitches such as fatty ester to enhance accessibility of laccase to fiber surface, or the hydrolysis and removal of stickies contaminants such as polyvinyl acetate from fiber to help improve fiber binding property. The three component dry strength composition of the current method provides improved and enhanced performances of paper dry strength relative to the use of one or two of the individual components alone. The present composition can also reduce organic contaminants and improves turbidity of white water in papermaking process. As used herein, enzyme composition is the combination or mixture of one or more enzymes. By "dry strength composition" it is meant the combination or mixture of laccase, lipase and cationic fixative polymer.

Examples of laccases that can be used in the current method are NS51003 and NS51002 from Novozymes (Bagsvaerd, Denmark); the optional laccase activator can be selected from copper sulfate, ascorbic acid and salicylic acid; lipases such as StickAway® or Resinase® A2X from Novozymes (Bagsvaerd, Denmark), and cationic fixative polymer such as those available from Solenis LLC (Wilmington, Del., USA) including Zenix DC® 7429 and Zenix® DC7479.

It should be noted that copper ion may be important for laccase's catalytic activity or enzyme stability. Laccase from a commercial sources could lose its activity when the copper ion is stripped away from the tertiary structure of a laccase protein. It was discovered that laccase can lose its activity quickly upon dilution with water, especially at elevated temperatures. This may be explained by the possibility that the copper ion is released from laccase when the enzyme solution is diluted. It was also discovered that the addition of a small amount of copper sulfate to a laccase formulation helped maintain the laccase activity upon dilution. With additional copper ion in the formulation, the equilibrium of copper ion shifts to the laccase protein so the tertiary structure of the enzyme is maintained in a stable form. Other ingredients of the dry strength composition may also extract the copper ion away from laccase so additional copper sulfate may be needed for the enzyme composition to maintain laccase activity. It was found that activity of laccase improved significantly when the copper sulfate was added to the enzyme composition in the range of 0.05 to 0.1 wt. %. However, when the copper level was further increased to 0.5 wt. %, the laccase lost some of its original activity.

The dry strength composition used in the current method is an aqueous formulation, typically containing up to 95% of water and 5-50% of other non-aqueous components.

In one embodiment of the dry strength composition, the active content of wherein the laccase content is from about 3 wt. % to about 40 wt. % and can be about 10 wt. % to about 25 wt. % by total weight of the composition; the lipase content is from about 1 wt. % to about 80 wt. %, can be from about 3 wt. % to about 40 wt. % and may be from about 5 wt. % to about 20 wt. % by total weight of the composition; and the cationic fixative polymer content can be from about 2 wt % to 50 wt. %, can be from about 5 wt. % to about 40 wt. %, and may be from about 7% to about 20% by total weight of the composition.

Laccase alone or in combination with a cationic fixative polymer, may be used in papermaking processes to improve paper properties. However, not all the cationic fixative polymers are compatible with laccase. It was found through laccase assays that some cationic fixative polymers can reduce or even deactivate laccase NS51003 (a laccase from Novozymes). Those cationic polymers include polyvinylamine and glyoxalated poly(acrylamide) that may have covalently reacted and cross-linked with laccase to deactivate the enzyme activity. It was also discovered that the enzyme composition of the current method performed better than a combination of laccase and cationic polymer in providing improved dry strength to a paper product made from recycled OCC, particularly from the poor quality OCC that contains lots of stickies and pitches contaminants.

The current method also relates to the process of making a paper product using a dry strength composition of laccase, lipase and a cationic polymer. In some aspects, a lignocellulosic fiber in an aqueous solution is formed to produce a pulp slurry. The dry strength composition is added to the pulp slurry and the slurry is dewatered and dried to produce the desired paper product. The lignocellulosic fiber in an aqueous solution as used herein is described as a pulp slurry, pulp furnish or pulp suspension, all of which mean the same thing.

The dry strength composition of the current method can be formulated at different weight ratios of laccase and lipase depending on the specific pulp furnish. In general, an enzyme composition with higher weight ratio of laccase to lipase gave better strength results for an unbleached virgin fiber or a good quality old corrugated container (OCC) furnish having Canadian standard freeness (CSF) higher than 500, while the enzyme composition with higher ratio of lipase vs. laccase gave better strength results for a poor quality recycled OCC furnish with freeness less than 400 CSF.

The dry strength composition of the current method may be also used to reduce organic contaminants in papermaking process and improve papermaking productivity. The cationic fixing polymer is effective in interacting with anionic trash, dispersing stickies and pitch particles, and helping improve fiber-to-fiber interaction and flocculation which could result in better drainage. It was found that the treatment of the recycled fiber with the enzyme composition had no negative effect on fiber yield of virgin unbleached fiber, and the enzyme composition improved fiber retention and white water turbidity of a recycled OCC furnish.

The enzyme compositions have shown synergistic effect in improving laccase activity and papermaking performance for enhanced dry strength properties of paper product made from lignocellulosic material, particularly recycled OCC fibers.

DETAILED DESCRIPTION OF THE INVENTION

The current method relates to paper products having improved dry strength. More particularly, the method relates to a composition for making a paper product that comprises laccase, lipase, cationic fixative polymer and optionally laccase activity modifiers or activators wherein the laccase content is from about wherein the laccase content is from about 3 wt. % to about 40 wt. % and can be about 10 wt. % to about 25 wt. % by total weight of the composition; the lipase content is from about 1 wt. % to about 80 wt. %, can be from about 3 wt. % to about 40 wt. % and may be from about 5 wt. % to about 20 wt. % by total weight of the composition; and the cationic fixative polymer content can be from about 2 wt. % to 50 wt. %, can be from about 5 wt. % to about 40 wt. %, and may be from about 7% to about 20% by total weight of the composition.

In other aspects, the current method relates to the use of enzymes to improve dry strength properties of a paper product. The method relates to the addition of a composition to a pulp furnish or suspension, such as a pulp furnish containing unbleached fibers or recycled brown stock, wherein the composition comprises a laccase with an activity of at least 12 LAMU and a lipase having a lipase activity of 0.1 KLU per Kg to 10 KLU per Kg of dry fiber, and wherein the enzymes are added to the papermaking process either before, during or after mechanical refining in a papermaking.

The laccase of the current method may be derived from microbial, fungal, or other sources. It may furthermore be produced by recombinant techniques. The laccase of the current method can be from a commercial source, for example, NS51003 and NS51002 from Novozymes (Bagsvaerd, Denmark).

The laccase of the current method can also include enzymes that possess laccase activity based on current assay methods. The activity of the laccase used in the Examples below were determined using syringaldazine as the substrate or by the ABTS assay.

Examples of enzymes containing laccase activity include, for example, laccase (EC 1.10.3.2), catechol oxidase (EC 1.10.3.1), mono-phenol monooxygenase (EC 1.14.99.1), bilirubin oxidase (EC 1.3.3.5), and ascorbate oxidase (EC 1.10.3.3). These can be used alone or in combination with one another. The EC (Enzyme Commission) number is based upon the Nomenclature Committee of the International Union of Biochemistry and Molecular Biology (IUBMB).

In other aspects of the current method, the laccase modifier or activator can be one or more inorganic or organic compounds, such as copper sulfate, copper ion salts, other metal ions salts, and ligands that help activate laccase activity, and also laccase mediators or activators including ascorbic acid, ascorbate, salicylic acid, salicylate, nicotinic acid, nicotinate, a hardwood black liquor, a softwood black liquor, ligno-organosolv, lignin sulfonate, 2-thiouracil, N-benzylidene-benzylamine, melamine, ferric chloride, potassium ferricyanide, guanidine, cyanuric acid, nicotinic acid, pyruvic acid, imidazole, phenol, and mixtures thereof. The term laccase modifier, laccase mediator, laccase activator, and laccase enhancer are used interchangeably and relate to the same compounds.

In yet another aspect of the current method, the laccase enhancer can be copper sulfate, ascorbic acid, salicyclic acid and combinations thereof. at a dosage of from about 0.01 wt. % to about 0.5 wt. % by weight of the total composition. The activity may be negatively affected by a high level of copper sulfate at >0.5% based on the total weight of the dry strength composition.

It should be noted that laccase needs oxygen to be active. Therefore, effective oxygen and air flow in the papermaking process helps to improve the enzyme activity and efficiency of the laccase in the papermaking application.

In some aspects of the current method, lipases can be derived from microbial, fungal, or other natural sources. Lipases can also be produced by a genetic recombinant technique or via chemical modifications. The enzymes possessing lipase activity include, for example, tri-alkanoate glycerol lipase, fatty ester lipase, esterase, phospholipase, or combination thereof. Commercially available enzymes containing lipase activity include, for example, StickAway® or Resinase® A2X, Resinase® NT, Palatase® from Novozymes (Bagsvaerd, Denmark), and Lipase G-1000 from DuPont Industrial Biosciences (Palo Alto, Calif., USA). The lipase activity in the following examples were determined using the standard lipase KLU (KLU equals to 1000 lipase Units, defined in WO 89/04361) or determined by lipase assays described in the current method.

The lipases of the current method also include enzymes that possess catalytic activity of hydrolyzing ester bonds, based on the assays of the current method. Enzymes, such as proteases and amidases are known to contain lipase activity and therefore could be used in the current method.

In one aspect of the present method, current method the lipase has high esterase activity as determined by lipase assay using triacetin as a substrate. This lipase preferably catalyzes the hydrolysis of hydrophobic polyvinyl acetate to release hydrophilic polyvinyl alcohol and acetic acid. One lipase is StickAway®, which possesses strong esterase activity towards triacetin but also lipase activity towards a fatty ester with a long chain alkyl group up to $C_{18}$ carbons.

When StickAway® was added to a polyvinyl acetate contaminated old corrugated container (OCC) suspension, the paper product made from the treated fiber achieved more than 10% improvement in strength properties over the control without lipase treatment (see Table 1).

It is envisioned any enzymes containing lipase activity towards short chain alkyl esters can also work to enhance fiber binding property and paper strength. For example, it was discovered that Resinase® A2X worked as well as StickAway® with North American OCC furnish (see Table 2).

In other aspects, the cationic fixative polymers used in the current method with the lacasses and lipases can be selected from the group consisting of poly(diallyldimethylammonium chloride), poly(dimethylamine-epichlorohydrin-ethylene diamine), cationic poly(acrylamide), poly(ethyleneimine), hydrophobically modified cationic polymers, long chain alkyl glycidyl ether modified poly(aminoamide), cationic natural products such as, cationic starch and cationic guar, amphoteric polymers that are net cationic, and combinations thereof. Other cationic fixative polymers that can be used in the current method are commercially available from Solenis LLC, Wilmington, Del., USA, such as Zenix DC® 7429, Zenix® DC7479 and DeTac DC786C. The cationic fixative polymers of the current method can be one or more papermaking additives such as a dry strength resins, wet strength resins, flocculants, retention aids, and/or drainage aids. It is worth noting that a different cationic polymer can be applied to a papermaking system in combination with the current dry strength composition to improve overall performance of the papermaking process. It should also be noted that not all the cationic fixative polymers are suitable for laccase and some cationic polymers, such as polyvinylamines and glycoxylated polyacrylamides can reduce or even deactivate the activity of laccase. For example, a polyvinylamine based cationic polymer negatively affects activities of laccase or lipase when the polymer is blended with the enzymes, but as long as the polymer is not blended directly with the enzymes, it could be used in combination with the laccase and lipase enzymes in the papermaking process.

In some aspects of the current method, the dry strength composition can be stabilized by one or more compounds selected from propylene glycol, glycerol, ethylene glycol, sorbitol, lactic acid, glucose, galactose, maltodextrin, monosaccharides, oligosaccharides, corn syrup, inorganic salts such as sodium and potassium chloride, a pH buffer system such as sodium or potassium phosphates, sodium citric acid, tris(hydroxymethyl)methylamine (Tris), 4-2-hydroxyethyl-1-piperazineethanesulfonic acid (HEPES); piperazine-N,N-bis(2-ethanesulfonic acid), and 2 2-(N-morpholino) ethanesulfonic acid.

In yet another aspect of the method, the dry strength composition of the current method includes at least one laccase, at least one lipase with high esterase activity as determined by the lipase assay using triacetin as substrate, at least one cationic fixative polymer selected from poly(diallyldimethylammonium chloride), poly(dimethylamine-epichlorohydrin-ethylene diamine), and mixtures thereof, and optionally a laccase activator, such as copper sulfate, ascorbic acid, salicyclic acid and combinations thereof.

The weight ratio of laccase/lipase/cationic polymer of the dry strength composition of the current method is important for its performance in papermaking as a strength additive. The ratio of these three main ingredients of the dry strength composition of the current method can be changed to a specific range to provide optimized enzyme activities and stability under specific pH, ionic strength and temperature conditions. The percentage levels of the three ingredients also affect laccase and lipase efficiencies of treating different types of unbleached lignocellulosic fibers to improve paper dry strength. The dry strength composition of the current method is an aqueous formulation, typically containing up to 95% of water and 5-50% of other non-aqueous components. In one embodiment of the dry composition, the active content of a laccase is from wherein the laccase content is from about 3 wt. % to about 40 wt. % and can be about 10 wt. % to about 25 wt. % by total weight of the composition; the lipase content is from about 1 wt. % to about 80 wt. %, can be from about 3 wt. % to about 40 wt % and may be from about 5 wt. % to about 20 wt. % by total weight of the composition; and the cationic fixative polymer content can be from about 2 wt. % to 50 wt. %, can be from about 5 wt. % to about 40 wt. %, and may be from about 7% to about 20% by total weight of the composition.

The active weight percentage of the laccase and lipase of the dry strength composition is defined on the basis that the commercial enzymes are 100% active as they are obtained from a commercial source. The active percentages of the cationic fixative polymer and laccase activator of the composition are defined as non-aqueous parts of these polymers or chemicals of the dry strength compositions.

The enzyme composition of the current method exhibited improved laccase activity relative to the original laccase. The term "improved laccase stability" is intended to indicate that the enzyme composition after being stored for a period of time at a certain temperature, and is subjected to the same standard test conditions as the original laccase at the same dilution factor, exhibits less in reduction of the laccase activity compared with that of the original laccase.

In the enzyme composition of the current method, lipase activity was measured using triacetin or tributyrin as substrates via the titration method as described in the example section. It was found that the cationic fixative polymer Perform® PC8229 and/or the laccase NS51003 had no negative effect on the lipase activity of StickAway®. The lipase activity of the composition was relatively stable.

In some aspects of the current method, the pH of the dry strength composition can be from about 3 to about 10, can be from about 4 to about 9, and can be from about 5 to about 8. In still other aspects of the method, laccase can be optionally mixed with a laccase activator for 5 to 30 minutes at room temperature followed by the addition of the lipase and cationic fixative polymer. However, in other aspects, the ingredients can be added in any sequence in the process of formulating the composition prior to the composition being added to the pulp furnish. The pH adjustment of the formulation can be done at the end of the process with an acid or an alkali after all the ingredients become a homogenous formulation. A buffer system may also be used to control the pH of the enzyme composition within a specific range.

Physical storage stability is a factor when evaluating the properties of the dry strength composition of the current method. The term "good physical stability" of the product is intended to indicate that the enzyme composition has maintained desired physical properties in appearance, homogeneity and having no deteriorated odor. The weight ratio of the cationic fixative polymer is one of the factors affecting such a stability.

The laccase enzyme activity of the laccase used in the current method, was measured by a standard syringaldazine assay as described in the experimental section. The activity was in the range from about 200 Laccase Myceliophthora Units (LAMU) to 10,000 LAMU per gram, can be from about 500 to about 5,000 LAMU per gram, and may be from about 1,000 to 2,000 LAMU per gram. The lipase activity of the enzyme used in the current method, is defined in WO 89/04361, and was in the range of from about 2 KLU/gram to 50 KLU per gram (one KLU is equal to 1,000 lipase Units), can be from about 5 KLU to about 25 KLU per gram, and may be from about 10 KLU per gram to about 30 KLU per gram. The laccase and lipase activities of the enzymes used in the dry strength composition may vary with specific batches of products and the commercial sources from where the enzyme came from. However, amounts used in the experiments were calculated based on the assumption of being 100% active as received.

In other aspects of the current method, the laccase activity of the dry strength composition of the current method is normally in the range of from about 40 LAMU per gram to about 2,000 LAMU per gram, can be from about 100 LAMU per gram to about 1,000 LAMU per gram, and may be from about 200 LAMU per gram to about 400 LAMU per gram. The lipase activity of the lipase used in the current method is normally in the range of from about 0.1 KLU per gram to about 15 KLU per gram, can be from about 0.25 KLU per gram to about 10 KLU per gram, and may be from about 0.5 KLU per gram to about 5 KLU per gram. The enzyme activities of the dry strength composition may be evaluated under specific pH and temperature conditions with different enzyme substrates as needed.

In some aspects of the current method, the dry strength composition may be used in treating all types of cellulosic fibers, such as lignocellulosic fiber including bleached, unbleached virgin fiber, mechanical fiber and OCC recycled fiber. In some aspects of the current method, the dry strength composition may be used to treat a mixture of bleached fiber, unbleached virgin fiber and recycled fiber at a certain fiber mixing ratio. In other aspects, the dry strength composition of the current method is useful in providing improved dry strength properties of recycled linerboard produced in papermaking. The dry strength composition may work effectively with poor quality recycled fiber from Asian such as TOCC (Taiwan OCC), COCC (Chinese OCC), EOCC (European OCC), and better quality AOCC (American OCC) as well as unbleached Kraft fiber (UBSK). The degree of the improvement in a specific strength property varies with fiber type and treatment conditions and the specific enzyme composition.

It was found that the dry strength composition of the current method usually provided higher improvement in Ring Crush to the paper made from a good quality fiber such as AOCC and UBSK while better performance was observed in dry tensile and Mullen Burst properties of the paper made from the poorer quality fibers such as TOCC or COCC or EOCC. In addition, the enzyme composition having a higher weight ratio of laccase vs. lipase is more efficient in improving ring crush and other strength properties than a better quality AOCC and unbleached virgin fiber. The composition having a higher weight ratio of lipase vs. laccase gave better results in treating poor quality OCC from Asian and Europe that contained high levels of stickies and pitches.

In another aspect of the current method, lignocellulosic fiber in suspension is treated for at least 0.1 hours with the dry strength composition wherein the dry strength composition has at least 12 LAMU of laccase activity and 0.1 to 10 KLU of lipase activity per Kg of dry fiber and the fiber suspension is at a temperature of from about 20° C. to about 70° C. and a pH of from about 4.0 to about 9.0. The treated fiber suspension can optionally be refined using a mechanical refiner for wood fiber either prior to or subsequent to the addition of the dry strength composition. The treated suspension can then be dewatered and dried to form the desired paper product. The dry strength properties of the paper product, such as Mullen burst, dry tensile, Ring Crush, ZDT, etc. are tested and the data normalized based on the basis weight of the blank sheet with treatment or the control with the individual ingredients of the enzyme composition.

In yet another aspect of the current method, the pH of the treated pulp furnish is from about 3.0 to about 9.0, can be from about 4.0 to about 8.5 and may be from about 4.5 to 8.0; contact time of the dry strength composition with pulp furnish is from about 0.1 hour to about 5 hours, can be from about 0.2 hours to about 3 hours and may be from about 0.3 to about 2 hours; The temperature can be in the range of from about 10° C. to 70° C., can be in the range of from about As the stock temperature, pH and other conditions in a papermaking system varies with paper machines and specific fibers, the efficiencies of laccase and lipase in a specific enzyme formulation may vary as well as their particular performances.

The enzyme composition of the current method can introduced into a pulper during the pulping stage, or brought into contact at any stock storage chest, high consistency chest or other holding tank. It can also be added into the paper machine white water or, alternatively, can be applied in the water treatment loops of virgin or recycling mills to treat wood fiber. An effective agitation or mixing is needed for the laccase and lipase to have an effective action on the fiber. Air flow in the papermaking system is particularly critical for laccase that needs oxygen to be active. Adding an oxidizing agent, such as oxygen, or hydrogen peroxide, and other peroxides, or TEMPO reagent, may help improve laccase efficiency in the oxidation reactions. The pulp consistency is also a factor for the effectiveness of the treatment by the enzyme composition. High pulp consistency reduces mass-transfer efficiency, resulting in non-uniform interactions between the enzyme composition and fiber. Low pulp consistency decreases the concentration of the enzymes in the pulp at the same dosage of the enzyme composition based on dry fiber and reduces enzyme efficiency. In general, the pulp consistency of the lignocellulosic fiber treated by the enzyme composition of the current method is in the range of 0.3% to 5%, preferably in the range of 0.5% to 4%, and most preferably in the range of 1% to 3%.

In some aspects of the current method, the laccase, lipase, the cationic fixative polymer, and optionally laccase activator of the dry strength composition can be formulated together providing a stable composition. In other aspects, the three or four ingredients can be used in any combination, added to the pulp furnish separately, be added at the same or different points in the papermaking process, and can be added in any sequence to the pulp furnish to realize the strength benefits of the composition.

The improved laccase activity was observed with the combination of laccase, laccase activator, lipase and cationic fixative polymer via ABTS laccase assay. The results have revealed that the cationic fixative polymer improved the laccase activity and lipase gave further improvement on the laccase activity than seen with the addition of the cationic polymer alone.

The dry strength composition of the current method may be used in combination with other papermaking performance additives to improve paper product properties, such as cationic, anionic, amphoteric, a nonionic synthetic compounds and natural polymers. Examples of compounds suitable for use with the composition of the current method include, but are not limited to, dry strength papermaking additives, such as starch, starch derivatives, polyacrylamide derivatives, guar, poly(vinylamine), contaminant control detackifiers or fixative detackifiers, such as nonionic or anionic detackifiers, hydrophobically end-capped poly(ethylene glycol), poly(vinyl alcohol-vinyl acetate), whey protein, soy protein, hydrophobic and hydrophilic block copolymers, hydrophobically modified hydroxyethyl cellulose, wet strength papermaking additives including, but not limited to polyethyleneimine, urea formaldehyde resin, epichlorohydrin reacted poly(aminoamide), starch aldehyde, glyoxalated poly(acrylamide); flocculants for water treatment; coagulants for water treatment; drainage aids for papermaking; retention aids for papermaking; sizing agent for paper products; adhesives; debonders; softeners; creping adhesives; plasticizers for optimizing resin properties; and modifiers for optimizing resin properties. Individual components of any of the above combinations may be applied together or sequentially in papermaking. Additionally, individual components listed above may be used in combination or blended together prior to use to make stable formulations or they can be combined on site at a paper mill prior to use.

In some aspects of the current method, the dry strength composition may be used in combination with one or more other enzymes such as hydrolases, cellulases, xylanases, proteases, amylases, hemicellulases, mannanases, pectinases, lyases, such as pectate lyase, cutinase, oxidoreductases, such as glucose oxidase and peroxidases, or any combinations thereof. These enzymes can be used in any form, such as in liquid or solid form. Individual enzymes or any combinations of different enzymes may be applied together with the dry strength composition of the current method, or applied sequentially before or after the addition of the dry strength composition of the current method. Individual enzymes may be also blended together with the dry strength composition of the current method to form a blended composition prior to use.

An experimental model was established to simulate a real situation in recycled paper mills. Polyvinyl acetate, as model stickies, may be coated onto OCC paper at 1-2 weight % (based on dry wt. fiber) and the coated fiber may be pulped to make a uniform furnish for the dry strength treatment and the subsequent papermaking. It was seen that the OCC fiber pulped from the coated paper had higher paper dry strength than the blank after the OCC fiber was treated with the enzyme composition of the current method or a lipase.

EXAMPLES

The following examples further illustrate the current method, and they are not intended to be in any way limiting to the scope of the method as claimed.
Determination of Laccase Activity Laccase activity was determined using syringaldazine as a substrate. In this assay, a laccase containing sample was incubated with syringaldazine dissolved in methanol under aerobic conditions in 0.1 molar (M) phosphate buffer at pH 7.5 and 25° C. for 110 seconds. The syringaldazine was oxidized to tetramethoxyl azo bis-methylene quinone having a molar absorptivity of 65,000 at A540 nanometer (nm). The absorbance was measured at 540 nm for 50 seconds. The standard laccase enzyme unit (LAMU) is the amount of enzyme which converts 1 micromole (μmol) syringaldazine to its quinone form per minute under the prescribed reaction conditions. One of the laccases used in the examples below is NS51003 from Novozymes (Bagsvaerd, Denmark) that has a laccase activity unit no less than 1,000 LAMU per gram as reported and measured at 1,050 LAMU per gram. The laccase activity can vary with batches, storage time and storage temperature.
ABTS Laccase Assay for Relative Laccase Activity The laccase activity was also determined using 2,2'-azino-bis(3-ethylbenzothiazoline-6-sulphonic acid (ABTS) as a substrate. One unit of activity is equal to the micromole of the oxidized product from ABTS per min per mg protein at pH 4.0 to 6.0 at 23° C. in an acetate buffer. The extinction coefficient of the oxidized ABTS had a molar absorptivity of 30,000 at A420 nm. A diluted enzyme solution (1.5 milliliter (ml)) was added to a mixture of 1.5 ml ABTS (0.5 millimole (mM)) solution and 1.5 ml of sodium acetate buffer (1 mM) to initiate the oxidization reaction. After mixing, incubation was conducted at 23° C., while the change in absorbance per minute was measured at 420 nm. Two *Aspergillus* laccases were used both from Novozymes (Bagsvaerd, Denmark), to compare with the enzyme compositions. The assay pH was found to have had an effect on laccase activity. NS51002 alone worked best at pH 4-5 while NS51003 worked best at pH 5-6.
Lipase Assay to Differentiate Esterase and Lipase for Short Chain and Long Chain Alkanoate Esters Lipase activity was determined using tri-alkanoate glycerol as a substrate. One unit of activity is equal to a micromole of alkanoic acid released in 1 minute by 1 gram enzyme at pH 7.0. A one gram sample of tri-alkanoate glycerol was added to 50 grams of a 0.2 molar (M) sodium chloride solution containing 10 microliter (μl) of 1% phenolphthalein in ethanol at 45° C. A lipase solution (0.01 g) was added to initiate a hydrolytic reaction. While stirring, the pH was maintained at 7.0 by adding 0.1M NaOH solution to give a slightly pink color (or using a pH-Stat). The total amount of NaOH solution consumed in 5 to 10 minutes was used to calculate the alkanoic acid released in the reaction per minute. In this type assay, triolein was used as a substrate for the lipase with activity to hydrolyze long chain alkanoate ester and triacetin was used as a substrate to measure esterase activity to hydrolyze short chain alkanoate ester. Tributyrin was also used as a substrate to measure both lipase and esterase activities. For example, as measured using triolein and triacetin as the substrates, StickAway® had 2.5 times more esterase activity than Resinase® A2X when triacetin was used as the substrate while StickAway® was only 44% of lipase activity of Resinase® A2X when triolein was used as the substrate.

The enzyme activity was also determined using p-nitrophenol esters of ethanoate, butanoate, dodecanoate, and hexadecanoate as substrates. One unit of activity is equal to µmol of p-nitrophenol released in 1 minute by 1 gram enzyme solution at pH 7.5 and 30° C. Substrate solutions (50 mM) of p-nitrophenol esters were dissolved in dimethyl sulfoxide prior to addition to the reaction mixture. The assay was initiated when the substrate solution was added to 50 mM sodium phosphate buffer (pH 7.5) solution containing lipase activity. Initial rates of p-nitrophenol release from the substrates were quantitated by measuring absorbance at 410 nm with molar absorptivity of 12.2 at pH 7.5.

One of the lipases used in the current method is StickAway® from Novozymes (Bagsvaerd, Denmark) that has the standard lipase at 16.4 KLU/g (KLU equals to 1,000 lipase Units, as defined in WO 89/04361). The activity can vary with batches, storage time and temperature.

Protein Assay

The protein concentration was determined using the Bio-Rad Protein Assay Method, which is a dye-binding assay based on the method of Bradford and involves the addition of an acidic dye to a protein solution, and subsequent measurement at 595 nm with a Jenway 6320D spectrometer. Comparison to the bovine serum albumin (BSA) standard curve provides a relative measurement of protein concentration. The Bio-Rad protein assay reagent was obtained from Bio-Rad Laboratories. The protein standard was bovine serum albumin (BSA).

The protein assay was used to measure protein content in percentage of the dry strength composition of the current method and to determine the specific enzyme activity.

Example 1

Synergetic Effect of Laccase, Lipase and Cationic Polymer Combination on OCC Paper Strength Example 1, demonstrates improvement in Mullen burst and Ring Crush paper dry strength properties of paper sheets made from 100% recycled OCC. The OCC medium fiber was pulped in water to 3% consistency creating a pulp slurry and refined to 320 milliliter CSF using a valley beater. The resulting pulp slurry was treated with laccase NS51003, StickAway® and cationic fixative polymer Perform® PC8229, each being added to the slurry individually and also in combinations at 50° C. for 60 minutes under effectively stirring. The dosages of the chemicals used for the treatment were based on the dry fiber in percentage. The combination of chemicals were mixed together prior to the addition to the pulp slurry. After the treatment, the pulp slurry was cooled down to room temperature using an ice water bath. Paper handsheets having a basis weight of 80 lb./3000 sq. ft. were made on a Noble and Wood hand sheet machine at pH 7.0. Mullen Burst (TAPPI Test Method T403) and Ring Crush (TAPPI Test Method T818) were determined, and expressed as % versus the control in Table I.

TABLE I

Synergetic effect of NS51003, StickAway ® and Perform ® PC 8229 on OCC paper strength.

| Examples | Laccase NS51003 Dose % | StickAway ® Dose % | Perform ® PC8229 Dose % | Ring Crush % | Mullen Burst % |
|---|---|---|---|---|---|
| Comparative example 1-1 | 0.2 | 0 | 0 | 105.1 | 103.6 |
| Comparative example 1-2 | 0 | 0.2 | 0 | 101.0 | 105.9 |
| Comparative example 1-3 | 0 | 0 | 0.2 | 92.5 | 102.2 |
| Comparative example 1-4 | 0.2 | 0.2 | 0 | 104.9 | 107.5 |
| Comparative example 1-5 | 0.2 | 0 | 0.2 | 104.9 | 109.1 |
| Comparative example 1-6 | 0 | 0.2 | 0.2 | 98.2 | 112.5 |
| Example 1-1 | 0.2 | 0.2 | 0.2 | 108.6 | 121.5 |
| Example 1-2 | 0.1 | 0.1 | 0.1 | 105.4 | 117.5 |

In Table I, NS51003 from Novozymes was the laccase, StickAway® was the lipase also from Novozymes and Perform® PC8229, a poly(diallyldimethylammonium chloride) from Solenis LLC was the cationic fixative polymer. The results indicate improved dry strength performances for the combination of laccase NS51003, lipase StickAway® and cationic fixative polymer Perform® PC8229 (Example 1-1 and 1-2) in both Mullen burst and Ring Crush compared with those individual components alone and in all the other combinations when only two of the three chemicals were used (Comparative Example 1-1 to 1-6). The dry strength composition containing the laccase, lipase and polymer (Example 1-1) gave 21.5% improvement in Mullen Burst over the blank at the same enzyme and polymer dosages and 17.5% improvement at 50% reduced enzymes and polymer dosages (Example 1-2). This clearly demonstrates the synergistic effect of the combination of the three components on Mullen burst. Dry strength improvement in the Ring Crush test with the three component system (Example 1-1) provided a 8.6% increase when compared with the laccase, lipase and polymer being added independently or in combinations of only two of the chemicals using the same enzyme and polymer dosages.

Example 2

Formulation Process of the Enzyme Compositions

Example 2, illustrates a method of preparing the dry strength composition of the current method using laccase, lipase, cationic fixative polymer and a laccase activator.

A laccase, optionally a laccase activator when needed, and a lipase were added sequentially to water at about 20° C. with gentle stirring until becoming a homogenous solution. A solution of the cationic fixative polymer was added to the homogenous solution over 20 minutes at room temperature. The temperature of the resulting solution was maintained at about 20° C. and stirred for 20 minutes and then the pH was adjusted to 7.0 using HCl or NaOH. The solution was a homogenous brown color. The active content in weight percentage of the laccase or lipase (also termed as 'laccase active' or 'lipase active') of the enzyme composition was based on the original enzyme at 100% active as it is obtained from a commercial source. The active content in weight percentage of the laccase activator or cationic fixative polymer (also termed as 'polymer active') of the dry strength composition is defined as the non-aqueous parts of the components of the dry strength composition. The Bio-Rad protein assay was used on the dry strength compositions to determine protein concentration of the enzyme composition. Some of the representative enzyme compositions are tabulated in Table II.

The compositions in Table II also contain 20% glycerol and water, unless otherwise noted, to make up 100% in total weight. Example 1-1 and Example 2-12 do not contain glycerol. Zenix® DC7479 is poly(dimethylamine-epichlorohydrin-ethylene diamine), a cationic fixative polymer from Solenis LLC.

Example 3

Synergy of the Enzyme Composition for Improved Laccase Activity

The ABTS laccase assay was used to evaluate the effects of cationic fixative polymer, lipase and the laccase activator of the dry strength compositions on laccase activity. The same amount of laccase active in each composition was used in the assay. In Table III, the relative activity numbers were determined by normalizing the values based on that of laccase alone at 100%. The effects of lipase StickAway® and cationic polymer Perform® PC8229 on the ABTS colorimetric assay were small but were also measured and included in the calculation.

TABLE III

Effect of additives on Laccase activity based on Laccase assay

| Examples | Enzyme Compositions Description | Laccase Activity (ABTS Assay) % |
|---|---|---|
| Comparative Example 3-1 | Laccase NS51003 only | 100 |

TABLE II

Formulation of the dry strength compositions of laccase, lipase and cationic polymers

| Examples | Laccase | Lipase | Cationic fixative polymer | Laccase activator | Appearance as made | Appearance after 30 days At 32-35° C. |
|---|---|---|---|---|---|---|
| Example 1-1 | NS51003, 33% | StickAway® 33% | Perform® PC8229, 33% | None | | |
| Example 2-1 | NS51003, 24% | StickAway® 6% | Perform® PC8229, 20% | None | Homogenous | No change |
| Example 2-2 | NS51003, 24% | StickAway® 6% | Perform® PC8229, 20% | CuSO4, 0.05% | Homogenous | No change |
| Example 2-3 | NS51003, 18% | StickAway® 12% | Perform® PC8229, 20% | None | Hotnogenous | No change |
| Example 2-4 | NS51003, 15% | StickAway® 15% | Perform® PC8229, 20% | None | Homogenous | A little settlement |
| Example 2-5 | NS51003, 15% | Resinase® 15% | Perform® PC8229, 20% | None | Homogenous | No change |
| Example 2-6 | NS51003, 18% | StickAway® 12% | Perform® PC8229, 20% | CuSO4, 0.05% | Homogenous | A little settlements |
| Example 2-7 | NS51003, 18% | StickAway® 12% | Perform® PC8229, 10% | None | Homogenous | No change |
| Example 2-8 | NS51003, 18% | Resinase® 12% | Perform® PC8229, 40% | None | Homogenous | Settlement |
| Example 2-9 | NS51003, 15% | StickAway® 15% | Zenix® DC7479, 20% | None | Homogenous | No change |
| Example 2-10 | NS51003, 18% | Resinase® 12% | Perform® PC8229, 20% | Ascorbic acid 0.5% | Homogenous | |
| Example 2-11 | NS 51003, 18% | StickAway® 12% | Perform® PC8229, 20% | Salicylic acid 0.5% | Homogenous | |
| Example 2-12 | NS51003, 40% | StickAway® 40% | Perform® PC8229, 20% | | Homogenous | |

TABLE III-continued

Effect of additives on Laccase activity based on Laccase assay

| Examples | Enzyme Compositions Description | Laccase Activity (ABTS Assay) % |
|---|---|---|
| Comparative Example 3-2 | Laccase NS51003 and Perform ® PC8229 18:20 blend | 104.5 |
| Example 2-3 | Enzyme composition | 108.2 |
| Example 2-10 | Enzyme composition with ascorbic acid | 115.5 |
| Example 2-11 | Enzyme composition with salicylic acid | 115.2 |
| Example 3-1 | Example 2-3 with 0.1% $H_2O_2$ | 107.2 |

As shown in Table III, with 20 parts of Perform® PC8229 (cationic fixative polymer) formulated with 18 parts of laccase NS51003 (comparative example 3-2), the laccase activity was enhanced by 4% over laccase alone (Comparative example 3-1). When an additional 12 parts of the fixative polymer (Example 2-3) was added to the composition another 4% improvement in laccase activity was observed, resulting in an 8% improvement in total activity over the laccase alone. Ascorbic acid or salicylic acid at 0.5% (Example 2-10, 2-11) in the assay further improved the activity by about 7% with an overall improvement at 15%. Hydrogen peroxide did not help improve laccase activity (Example 3-1).

Copper ion such as that from copper sulfate was found to improve the activity of laccase alone after the laccase enzyme was diluted. With 0.05% to 0.1% of copper sulfate, the laccase activity improved more than 30% while it was negatively affected when the dosage of copper sulfate was higher than 0.5%. The effect of copper sulfate in the composition on laccase activity is not significant.

Example 4

Performance of Enzyme Composition on Dry Strength of Paper Made from UBSK/TOCC Fiber Mix Via the Pilot Paper Machine Trial Example 4, shows the improvement in dry strength properties of a paper sheet made from unbleached softwood Kraft (UBSK)/TOCC fiber mix (25:75) by treating the lignocellulosic fiber with the dry strength composition of the current method. The UBSK was pulped and refined to 475 ML CSF using a circle beater and then blended with TOCC (CSF 300 ML) in the slurry chest at a temperature of about 50° C. to 60° C. The mixed furnish was transferred to a machine chest of a pilot paper machine (located at the Hercules Research Center in Wilmington, Del.) and then treated with the dry strength composition at 0.4% dosage based on the dry fiber for 15 minutes at 55° C. with agitation. The treated furnish or slurry was transferred to a small machine chest and used to produce paper sheets having a basis weight of 80 lb./3000 sq. ft. The Mullen Burst and Ring Crush properties of the paper sheets were measured, normalized and expressed as % versus the blank sheet made from UBSK/TOCC fiber mix at the 50/50 ratio with no dry strength additive (see Table IV).

TABLE IV

Strength performance of fiber substitution with the enzyme composition

| Examples | Fiber composition | Enzyme composition | Ring Crash % | Mullen Burst % |
|---|---|---|---|---|
| Comparative Example 4-1 | UBSK/TOCC (50/50) | None | 100 | 100 |
| Comparative Example 4-1 | UBSK/TOCC (25/75) | None | 95.2 | 86.5 |
| Example 4-1 | UBSK/TOCC (25/75) | Example 2-12 | 103.3 | 89.5 |

The UBSK/TOCC fiber mix (50:50) blank was a benchmark in this pilot paper machine trial (Comparative example 4-1). Substituting 50% UBSK with TOCC resulted in 5% lower in Ring Crush and 14% lower in Mullen Burst (Comparative example 4-2). The dry strength composition of the current method (Example 2-12) had 8% higher Ring Crush and 3% higher Mullen Burst than the control without the treatment (Example 4-1). The treated furnish also achieved 50% UBSK reduction and was 3% higher in Ring Crush.

Example 5

Effect of Mechanical Refining on Enzyme Compositions' Performance in Paper Dry Strength Example 5, shows the improvement in dry strength properties of a paper sheet made from AOCC by treating the fiber with two dry strength compositions of the current method either prior to or after mechanical refining. For the pre-refining experiment, the pulp slurry was incubated with the dry strength compositions for 1 hour at 60° C., and then refined to 300 CSF using a PFI mill. For post-refining treatment, the pulp slurry was first refined to 300 CSF using a PFI mill and then the resulting pulp slurry was treated with the dry strength compositions. The dosage difference in the two enzyme compositions was determined based on approximately equal costs of the two compositions. The treated pulp furnish was used to make handsheets having a basis weight of 80 lb./3000 sq. ft. The Mullen Burst and Ring Crush of the handsheets were measured and expressed as % versus the corresponding blanks for the pre-refining furnish and the post-refining furnish. Results are summarized in Table V below.

TABLE V

Strength performance of the enzyme composition on OCC before and after refining

| Examples | Enzyme composition | Refining after the treatment | Dosage | Mullen Burst % | Ring Crush % |
|---|---|---|---|---|---|
| Example 5-1 | Example 2-3 | PFI mill | 0.25 | 105.4 | 117.2 |
| Example 5-2 | Example 2-1 | PFI mill | 0.3 | 106.3 | 110.8 |
| Example 5-3 | Example 2-3 | No | 0.25 | 102.5 | 113.3 |
| Example 5-4 | Example 2-1 | No | 0.3 | 103.1 | 111.2 |

The results show good improvement in Ring Crush (>10%) with the AOCC furnish whether the dry strength composition was added to the furnish pre-refining or post refining of the furnish (Example 5-1 to 5-4). The improvement in Mullen Burst was less but pre-refining treatment appeared to give better Mullen burst strength properties at 5% to 6% over the blank (Example 5-1, 5-2).

Example 6

Performance of the Enzyme Compositions with Different Types of OCC Furnishes In this experiment, TOCC and COCC, an OCC recycled fiber from Asia was used. This recycled fiber is of poor quality and a CSF<300 ML, while AOCC is a much better quality OCC fiber with freeness in the range from 400 to 600 ML CSF. The TOCC furnish also contains a lot of organic stickies and pitches. Handsheet experiments were done using two dry strength compositions made according to the current method were evaluated on the poor quality TOCC and better quality AOCC for dry strength performance. AOCC furnish was refined to a pulp slurry of 300 ML CSF using a PFI mill and was then treated with the dry strength compositions. The TOCC slurry was treated with the dry strength compositions without mechanical refining. All the treated pulp furnish was used to make handsheets having a basis weight of 80 lb./3000 sq. ft. The Mullen Burst, Ring Crush and/or dry tensile of the handsheets were measured and expressed as % versus the blanks without enzyme treatment (see Table VI).

TABLE VI

Performance of the enzyme compositions on TOCC and AOCC

| Examples | Enzyme composition | OCC furnish | Dosage wt. % vs. fiber | Mullen Burst % | Dry Tensile % | Ring Crush % |
|---|---|---|---|---|---|---|
| Example 6-1 | Example 2-1 | TOCC | 0 | 100 | 100 | 100 |
| | | | 0.15 | 101.2 | 100.6 | 106.5 |
| | | | 0.3 | 103.8 | 105.6 | 112.2 |
| Example 6-2 | Example 2-1 | AOCC | 0 | 100 | | 100 |
| | | | 0.1 | 104.2 | | 108 |
| | | | 0.2 | 106.1 | | 117.5 |
| | | | 0.4 | 107.9 | | 116.4 |
| Example 6-3 | Example 2-3 | TOCC | 0 | 100 | 100 | 100 |
| | | | 0.15 | 107.5 | 113.5 | 103.0 |
| | | | 0.3 | 109.2 | 115.1 | 105.5 |

Table VI shows the results of a handsheet trial using two OCC fibers having different paper dry strength properties and two dry strength compositions. These experiments demonstrated different performance of the two different enzyme compositions with TOCC. The enzyme composition with different weight percentages of laccase vs. lipase (i.e. 18% vs 12% (Example 2-3)) gave better performance in dry tensile and Mullen burst with TOCC (15% improvement in Mullen Burst at 0.3% dosage (Example 6-3)) while the dry strength composition with higher levels of laccase and the weight % of laccase vs. lipase at 24% to 6% (Example 2-1) had better performance in Ring Crush, giving 12% improvement at 0.3% dosage but less improvements in dry tensile and Mullen Burst (Example 6-1).

Each reference cited in the present application above, including books, patents, published applications, journal articles and other publications, is incorporated herein by reference in its entirety.

What is claimed is:

1. A method of making a paper or paper product comprising:
providing a pulp furnish or suspension;
adding to the pulp furnish or suspension a composition comprising from about 3 wt. % to about 40 wt. % weight of total composition laccase, from about 1 wt. % to about 80 wt. % weight of total composition lipase, and from about 2 wt. % to 50 wt. % by weight of total composition cationic fixative polymer and optionally laccase activator.

2. The method of claim 1, further comprising a laccase mediator or activator in an amount of from about 0.01% by wt. of total composition to about 0.5% by wt. of total composition.

3. The method of claim 2, wherein the laccase mediator or activator is selected from the group consisting of an inorganic, an organic compound and combinations thereof.

4. The method of claim 3, wherein the laccase mediator or activator is selected from the group consisting of copper sulfate, copper ion salts, other metal ions salts, and ligands that helps activate laccase activity.

5. The method of claim 3, wherein the laccase mediator or activator is selected from the group consisting of ascorbic acid, ascorbate, salicylic acid, salicylate, nicotinic acid, nicotinate, a hardwood black liquor, a softwood black liquor, ligno-organosolv, lignin sulfonate, 2-thiouracil, N-benzylidene-benzyl amine, melamine, ferric chloride, potassium ferricyanide, guanidine, cyanuric acid, nicotinic acid, pyruvic acid, imidazole, phenol and combinations thereof.

6. The method of claim 1, wherein the laccase is selected from the group consisting of laccase, catechol oxidase, mono-phenol monooxygenase, bilirubin oxidase, ascorbate oxidase, and other enzymes that possess laccase activity and combinations thereof.

7. The method of claim 1, wherein the lipases is selected from the group consisting of tri-alkanoate glycerol lipase, fatty ester lipase, esterase, phospholipase, and other enzymes that possess catalytic activity of hydrolyzing ester bonds, and combinations thereof.

8. The method of claim 1, wherein the cationic fixative polymer is selected from the group consisting of poly (diallyldimethylammonium chloride), poly(dimethylamine-epichlorohydrin-ethylene diamine), cationic poly(acrylamide), poly(ethyleneimine), hydrophobically modified cationic polymers, $C_8$-$C_{10}$ alkyl glycidyl ether modified poly(aminoamide), cationic natural product, and amphoteric polymers that are net cationic, cationic starch, cationic guar and combinations thereof.

9. The method according to claim 1, wherein the laccase content of the composition can be from about 10 wt. % to about 25 wt. % by wt. total composition.

10. The method according to claim 1, wherein the lipase content can be from about 3 wt. % to about 40 wt. % by weight of total composition.

11. The method according to claim 1, wherein the lipase content can be from about 5% to about 20% by weight of the total composition.

12. The method according to claim 1, wherein the cationic fixative polymer content is from about 5% to about 40% by weight of the total composition.

13. The method according to claim 1, wherein the cationic fixative polymer content can be from about 7% to about 20% by weight of the total composition.

* * * * *